United States Patent [19]

Matsuo

[11] Patent Number: 4,774,568

[45] Date of Patent: Sep. 27, 1988

[54] ENDOSCOPIC APPARATUS

[75] Inventor: Satoshi Matsuo, Ootawara, Japan

[73] Assignee: Kabushiki Kaisha Toshiba, Kawasaki, Japan

[21] Appl. No.: 7,222

[22] Filed: Jan. 27, 1987

[30] Foreign Application Priority Data

Jan. 27, 1986 [JP] Japan .................................. 61-13857
Mar. 22, 1986 [JP] Japan .................................. 61-64396

[51] Int. Cl.⁴ .......................... A61B 1/04; A61B 1/06; H04N 7/18
[52] U.S. Cl. .......................................... 358/98; 128/4; 128/6; 358/29; 358/160
[58] Field of Search ................. 358/98, 140, 160, 139, 358/29; 128/4, 6

[56] References Cited

U.S. PATENT DOCUMENTS 4,598,315  7/1986  Penney .............................. 358/139
4,667,230  5/1987  Arakawa ............................ 358/98
4,677,470  6/1987  Cooper .............................. 358/98

Primary Examiner—Howard W. Britton
Attorney, Agent, or Firm—Foley & Lardner, Schwartz, Jeffery, Schwaab, Mack, Blumenthal & Evans

[57] ABSTRACT

An endoscopic apparatus in accordance with the present invention comprises a scope of varied type with a solid state image pickup element which is connected arbitrarily to the body of the apparatus to obtain an image signal of a body to be inspected, a digital scan converter which converts an image signal from the scope to a digital signal to be stored in a memory circuit, and reads a signal to convert it again to an analog signal in order to output a predetermined image signal, a television monitor which displays an output from the digital scan converter, an ID detection member which is provided in a connector that connects the scope to the body of the apparatus in order to detect the kind of the scope, and a system controller which controls the digital scan converter so as to display a correct image of the body to be inspected at a predetermined position of the television monitor in accordance with the detected signal from the ID inspection member.

9 Claims, 4 Drawing Sheets

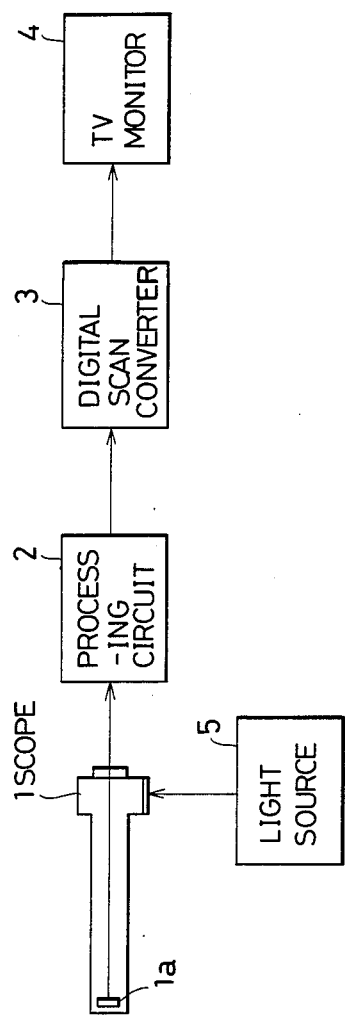
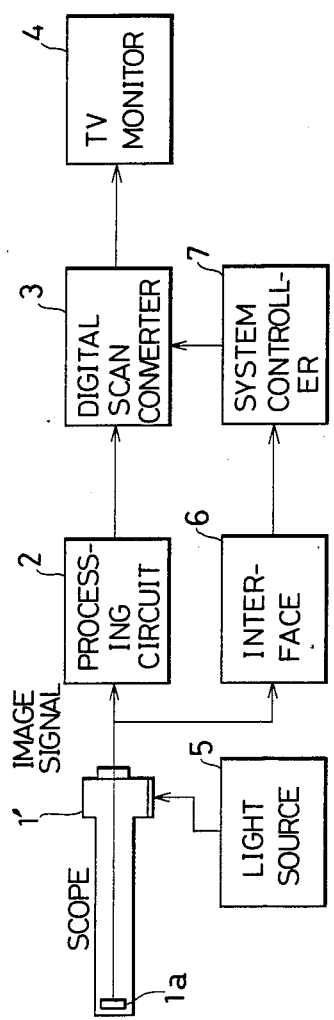

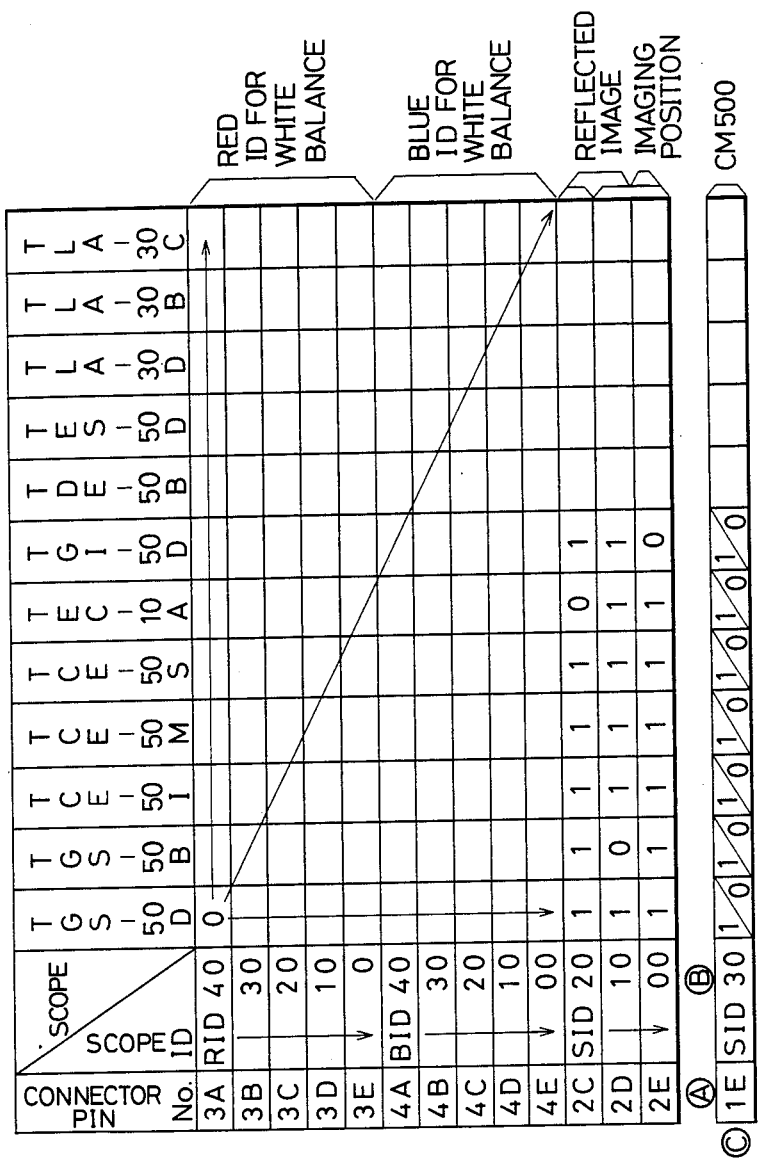

| 2E | 1 | 1 | 0 | 0 |
|---|---|---|---|---|
| 2D | 1 | 0 | 1 | 0 |
|  | FORWARD-LOOKING | SIDEWARD LOOKING | SHALL CCD FOR SHALL DIAMA | DON'T USE |

REFLECTED ID
 1 : REFLECTED IMAGE
 0 : NON-REFLECTED IMAGE

ENDOSCOPIC APPARATUS

BACKGROUND OF THE INVENTION

1. Field of the Invention

The present invention relates to an endoscopic apparatus, and more particularly, to an improvement of image display control for an electronic type endoscope which has a memory for a function (called the digital scan converter (DSC) hereinafter) that is capable of arbitrarily controlling the writing of a data in the memory, and the reading of a data from, the memory.

2. Description of the Prior Art

A prior-art electronic endoscopic apparatus which has a solid state image pickup element incorporated on the tip of the scope has in general a configuration as shown in FIG. 1.

In the figure, the electronic endoscopic apparatus includes a scope which has a solid state image pickup element 1a incorporated on its tip, a processing circuit 2 which converts a signal obtained by the solid state image pickup element 1a to a video signal of the NTSC or RGB systems, a DSC 3 which converts an output of the processing circuit 2 to a digital signal, stores it in a memory circuit, reads it out in a form desired, and outputs it by converting it back to an analog signal, and a television monitor 4 which displays an output from DSC 3 as an image. Light radiated from a light source 5 is led to the tip of the scope by means of a light guide, and is used to illuminate the interior of the digestive system or the like. Generally, DSC 3 allows the writing and reading out of data in an arbitrary form. Therefore, it is possible to carry out the inversion between left and right, the shift of the position, and the inversion between up and down of an image that is displayed on the television monitor 4.

On the other hand, there are various type of scopes such as forward-looking, sideward-looking, and oblique-looking, and moreover, their thickness varies depending upon the region to be inspected or the purpose of the use. Such structural differences lead to the various differences in the restrictions, and affect deeply the disposition of the solid state image pickup element or bring about the necessity of inserting a reflecting body such as mirror and prism in the light path. As a result, the focusing position on the solid state image pickup element differs for different type of scope, or the image may appear left and right reversed.

Furthermore, in the forward-looking type of scope, the solid state image pickup member is disposed in a longitudinal direction of the scope, therefore, it is necessary to insert the reflecting body.

For this reason, deviation in the image display position on the television monitor 4 due to the difference in various kinds of scopes, the left-right inversion, and so forth are corrected manually within DSC 3 to display a correct image at a predetermined position without left-right inversion.

The manual operation of the DSC 3 for the conventional system is complicated as well as annoying.

In addition, endoscopic apparatus used in medical diagnosis for obtaining an image by incorporating a solid state image pickup element in the endoscope has superior resolving power of image and function as an apparatus compared with the type that employs optical fibers. On the other hand, however, the configuration of the apparatus is intricate so there is a possibility of an interruption during inspection of the collection of images of the object to be inspected due to failures in the electrical circuit.

The image obtained by the solid state image pickup elements are converted in the processing circuit to the so-called composite bit signal (namely, a signal obtained by mixing a synchronizing signal and a video signal) or to the R, G, and B signal which is stored in a memory unit and also is sent to the television monitor to be used for image display.

This process is analogous to taking an image of a scenery or persons with a conventional television camera, and displaying it on the television screen. Just like in this case the image may fail to appear on the television screen due to failure in the television camera, in the case of an apparatus which utilizes solid state image pickup elements, there may occur a case in which the image on the television monitor is disturbed or display is interrupted due to failure, for instance, in the memory unit.

Such disturbances in the image or an interruption in display due to failure in the processing circuit or the like, has to be avoided by all means since it may result in a medical disaster, as mentioned earlier.

One method of preventing such a medical disaster before it happens may be to carry out strict checkup at the time of starting the apparatus and before starting the inspection. However, it is not easy in practice to discover a defective part in such a checkup.

SUMMARY OF THE INVENTION

An object of the present invention is to provide an endoscopic apparatus which is capable of automatically carrying out image display operation in response to the type of the scope.

Another object of the present invention is to provide an endoscopic apparatus which is capable of continuing image display of the zone of the object to be inspected, when a failure is developed in a part of the circuit system, by isolating the defective part from the circuit system.

A feature of the present invention is that the endoscopic apparatus comprises a scope of varied types which is provided with a solid state image pickup element on its tip that can be connected selectively to the body of the apparatus to obtain an image of the object to be inspected, a digital scan converter which converts an image signal from the scope to store it in a memory circuit and outputs a predetermined signal by reading out the signal to convert it back again to an analog signal, a television monitor which displays a signal from the digital scan converter, an ID detection member provided in a connector for connecting the scope and the apparatus body to detect the kind of the scope, and a system controller which controls the digital scan converter so as to have a non-reflected image of the object to be inspected at a predetermined position of the television monitor in accordance with the detected signal from the ID inspection member.

Another feature of the present invention is that the endoscopic apparatus comprises a scope of varied type with a solid state image pickup element on its tip which is connected selectively to the body of the apparatus to obtain a correct image of the object to be inspected, a digital scan converter which converts an image signal from the scope to a digital signal to be stored in a memory and reads out the signal to convert it again to an analog signal to output it as a predetermined image signal, a television monitor which displays the signal from the digital scan converter, and a bypass circuit and a manual operation switch which supplies, when there is a failure in the digital scan converter, an image signal from the scope to the display means by bypassing the digital scan converter.

These and other objects, features and advantages of the present invention will be more apparent from the following description of a preferred embodiment, taken in conjunction with the accompanying drawings.

BRIEF DESCRIPTION OF THE DRAWINGS

FIG. 1 is a block diagram for showing the configuration of a prior-art endoscopic apparatus;

FIG. 2 is a block diagram for showing the configuration of an endoscopic apparatus embodying the present invention;

FIG. 5A is a diagram for showing the relation between the kind of scope and the ID signal in the connector shown in FIG. 4;

DESCRIPTION OF THE PREFERRED EMBODIMENT

FIG. 2 is a block diagram for an endoscopic apparatus embodying the present invention, and the elements identical to those of the prior-art apparatus shown in FIG. 1 are given identical numbers to omit further description.

Figure 4:
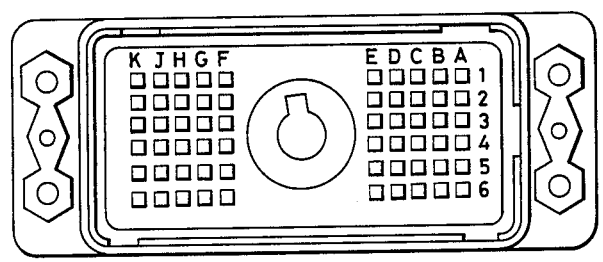
FIG. 4 is a diagram showing the connector that connects the scope to the body of the apparatus.
Figures 5B, 6:
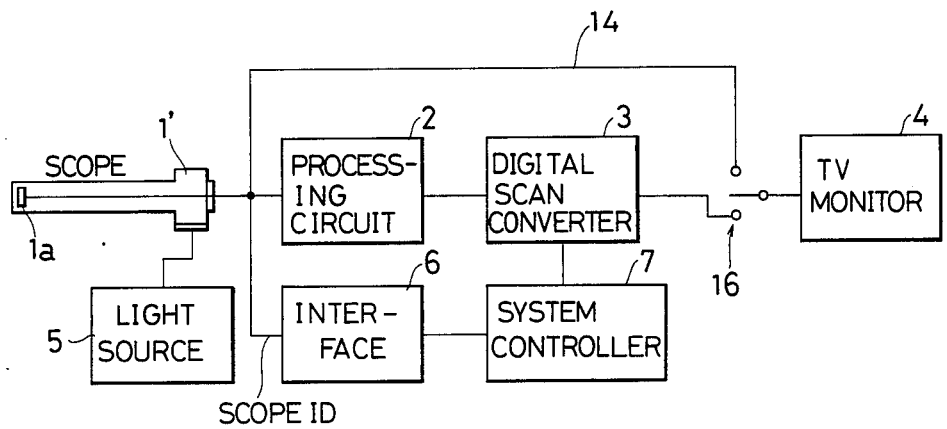
FIG. 5B is a diagram for showing the relation between the ID signal and the focusing position.
FIG. 6 is a block diagram for showing the configuration of a modification of the endoscopic apparatus in accordance with the present invention.

The present apparatus includes a scope 1' which has a basic structure analogous to the conventional apparatus, but differing from the prior scope 1 it is equipped with an ID device which identifies the type of scope. Namely, a plurality of ID pins (2A, 2B, and 2D) are provided, for example, in a connector that connects the scope 1' to the apparatus body, as shown in FIG. 4. The imaging position on the solid state image pickup element, reflected image/non-reflected image, and so forth in various types of scope are made to be identifiable, by individualizing ID pins corresponding to various kinds of scope, as shown in FIG. 5A and FIG. 5B.

Further, the apparatus of the embodiment has a system controller 7 which is connected to the scope 1' via an interface 6 for reading the ID signal and the output line 12 for ID signal. The system controller 7 reads an ID signal via the interface 6 and outputs to DSC 3 various kinds of control signals such as the start/end address of data writing, start/end address of data reading that can be determined uniquely by the ID signal, signals that are combinations of the addresses, order of writing, and various kinds of timing signals.

Consequently, when the type of the scope is decided upon, the imaging position, whether the image is a reflected image or a non-reflected image, and so on are determined by the ID of the scope to be used, so that by a mere connection of the scope to be used to the apparatus body by means of the connector, image position and discrimination information for reflected image/non-reflected image obtainable from the ID signal are inputted to the system controller 7. Based on the input signal, the system controller 7 sends to DSC 3 control signals that are required for displaying an image at a predetermined position all the time, and moreover, as a non-reflected image.

Figure 3:
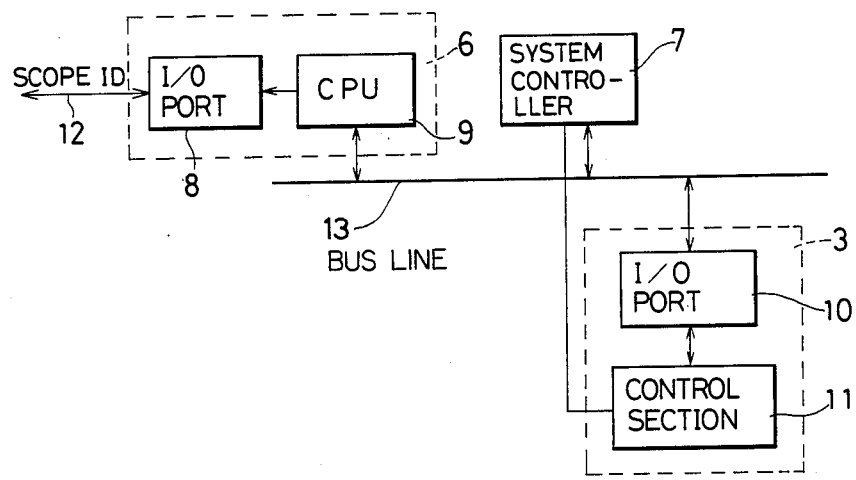
FIG. 3 is a block diagram which shows more specifically the relationship among the interface, the system controller, and the DSC 3 in the apparatus shown in FIG. 2.

FIG. 3 is a diagram which shows the relationship among the interface 6, system controller 7, and DSC 3. The interface 6 outputs a scope ID signal from the signal output line 12 to an I/O port 8 which is read at CPU 9, and outputs the scope ID signal to a bus line 13 by converting it to a predetermined form. The bus line 13 is controlled by the system controller 7, and CPU 9 serves as one of the I/O's of the system controller 7. The scope ID signal which is converted to a predetermined form in CPU 9 is supplied to the system controller 7. The system controller 7 recognizes the scope ID, outputs the above-mentioned data to the bus line as the system controller 7, and CPU 9 serves as one of the I/O's of the system controller 7. The scope ID signal which is converted to a predetermined form in CPU 9 is supplied to the system controller 7. The system controller 7 recognizes the scope ID, outputs the above-mentioned data to the bus line as well as outputs pulse signals such as a clock signal and an enable signal, and various kinds of command signals to a control section 11 within the DSC 3 as control signals. Upon receipt of these signals, DSC 3 displays an image in a desired format on the television monitor 4.

It should be noted that although the scope ID is designated as an input to the I/O port 8, it is sufficient as an ID signal to have a signal which can identify the imaging position on the solid state image pickup element and whether the image is a reflected image or a non-reflected image, in order to control the display position and the left-right inversion, so far as the image display is concerned.

As has been described in detail in the foregoing, according to the present invention, when a kind of scope is connected to the body of the apparatus, its ID signal is read automatically, and based on that, a desired display is given automatically. Accordingly, the user is liberated from the necessity of identifying various kinds of operations that are related to the image display for different types of scopes used.

Next, referring to FIG. 6, a modification of the endoscopic apparatus according to the present invention will be described.

In the modified apparatus, when a failure is developed in the processing circuit 2, the digital scan converter 3, or other part in the first embodiment, the image signal is directly supplied selectively, bypassing the defective circuit to be used for image display. For that purpose, in addition to the apparatus of the first embodiment, there are included a bypass circuit 14 for bypassing the processing circuit 2 and the digital scan converter 3, an operation switch 16 for sending the signal from the bypass circuit 14 and the signal from the digital scan converter 3 to the television monitor 4 by arbitrarily switching between them. In addition, when a scope which does not utilize mirrors, and moreover, which does not require the necessity of correcting the imaging position on CCD is connected to the body of the apparatus in the above modification, it is possible to bypass the digital scan converter 3 by switching the operation switch 16.

Furthermore, in this modification, it is possible to automatically operate the switch 16 by the signal from the system control, when the processing circuit 2 and/or the digital scan converter 3 go wrong.

As has been described in detail, according to the above modification, it is possible to provide an endoscopic apparatus which can provide a precautionary measure against medical disasters, even when there are developed failures in the video signal processing means which applies various kinds of processings to the image signal, by supplying image signals from the scope 1' to the television monitor to be used for image display.

Various modifications will become possible for those skilled in the art after receiving the teachings of the present disclosure without departing from the scope thereof.

What is claimed is:

1. An endoscopic apparatus, comprising:
    a variable type scope having a solid state image pickup element on its tip, said element connected to the apparatus to selectively supply either a reflected image signal or a nonreflected image signal of the object being inspected;
    a digital scan converter for converting the image signal from said scope to a digital signal, storing said digital signal in a memory circuit and reconverting said digital signal to an analog signal, to provide a predetermined image signal;
    means for displaying said image signal from said digital scan converter;
    means for selecting the type of said scope; and
    means for controlling said digital scan converter so as to display a nonreflected image of the body being inspected at a predetermined position in said display means in response to the detected signal from the scope detection means.

2. The endoscopic apparatus as claimed in claim 1, further comprising:
    bypass means for supplying image signals from said scope directly to said display means, thereby bypassing said digital scan converter when a failure develops in said digital scan converter.

3. The endoscopic apparatus as claimed in claim 2, wherein said bypass means comprises a bypass circuit for bypassing said digital scan converter and a manual operation switch for selectively supplying to said display means the signal from the bypass circuit or the signal from the digital scan converter.

4. The endoscopic apparatus as claimed in claim 1 wherein said detection means comprises an ID detection member provided in the connector means between said apparatus body and said scope, said ID detection member supplying a scope ID signal identifying the type of scope.

5. The endoscopic apparatus as claimed in claim 4, wherein said controlling means comprises an I/O port for receiving the scope ID signal from the ID detection member, a CPU for converting the scope ID signal received from the I/O port to a predetermined form, a system controller for receiving the scope ID signal converted by the CPU to supply image position and discrimination information for a reflected or nonreflected image, a clock signal, an enable signal, and command and control signals to said digital scan converter.

6. The endoscopic apparatus as claimed in claim 4, wherein the detected signal from the ID detection member includes discrimination information for the imaging position of said solid state image pickup element.

7. The endoscopic apparatus as claimed in claim 6, wherein the detected signal from the ID detection member includes information for discriminating between a nonreflected output image and a reflected output image.

8. An endoscopic apparatus, comprising:
    a scope of variable type, said scope having a solid state image pickup element on its tip, said pickup element connected to the body of the apparatus to obtain an image signal of an inspected object;
    a digital scan converter for converting an image signal from said scope to a digital signal, storing said digital signal in a memory circuit, and reconverting it to an analog signal, in order to generate a predetermined image signal;
    means for displaying said image signal; and
    bypass means for supplying an image signal from said scope to said display means by bypassing said digital scan converter when a failure develops in said digital scan converter.

9. The endoscopic apparatus as claimed in claim 8, wherein said bypass means comprises a circuit for bypassing said digital scan converter, and manual switch means for selectively supplying to said display means the signal from the bypass circuit or the signal from the digital scan converter.

* * * * *